Figure 1:
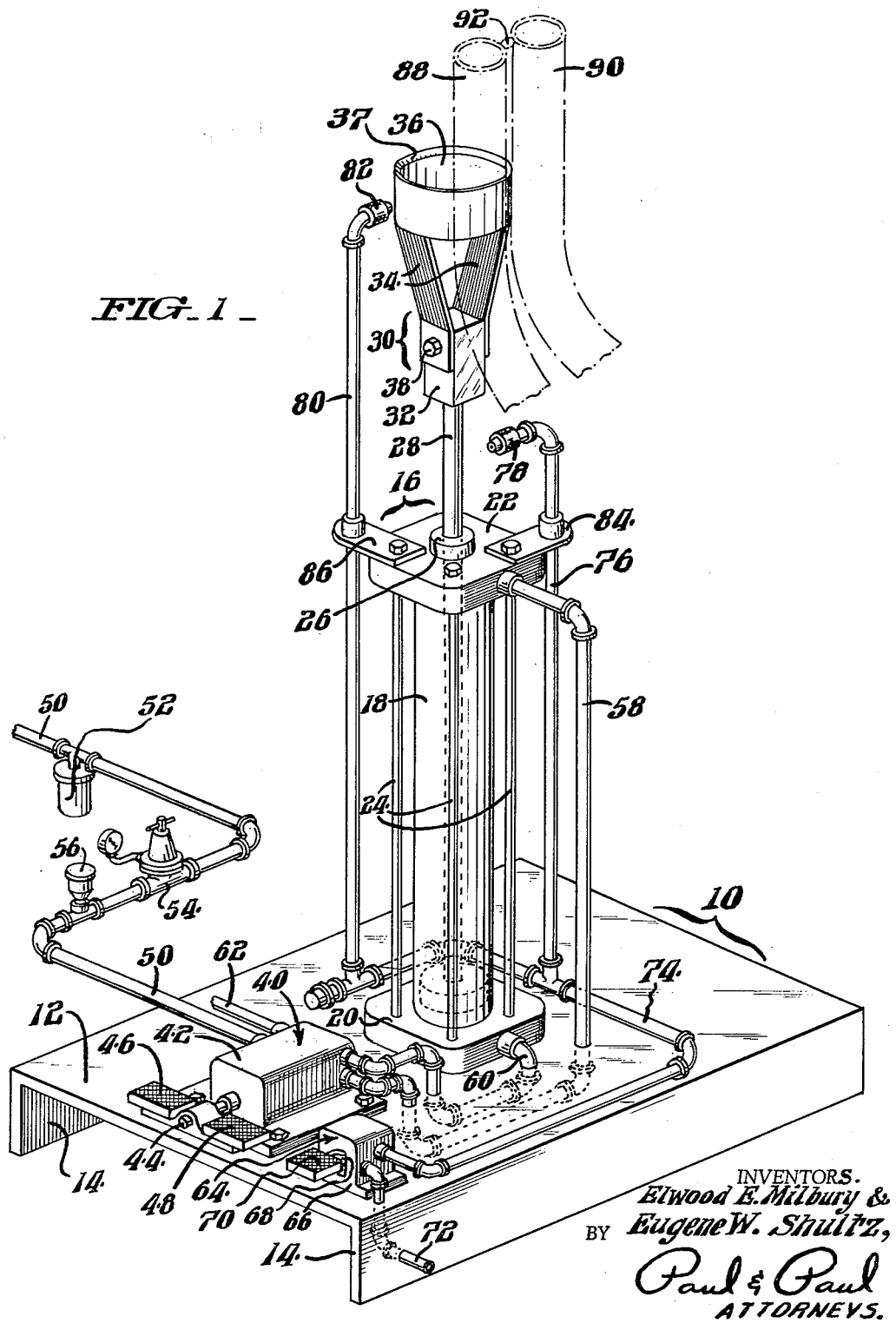

Aug. 6, 1963

E. E. MILBURY ETAL 3,099,857

APPARATUS FOR SEPARATING THE WINDPIPE FROM THE
ESOPHAGUS OF AN ANIMAL

Filed July 3, 1961

INVENTORS.
Elwood E. Milbury &
BY Eugene W. Shultz,

Paul & Paul
ATTORNEYS.

United States Patent Office 3,099,857
Patented Aug. 6, 1963

3,099,857
APPARATUS FOR SEPARATING THE WINDPIPE
FROM THE ESOPHAGUS OF AN ANIMAL
Elwood E. Milbury, Collingswood, N.J., and Eugene W. Shultz, Philadelphia, Pa., assignors, by mesne assignments, to Humane Slaughtering Device Corporation, Philadelphia, Pa., a corporation of Pennsylvania
Filed July 3, 1961, Ser. No. 121,446
3 Claims. (Cl. 17—1)

This invention relates generally to apparatus for dressing animals, and particularly to improvements in apparatus for separating the windpipe from the esophagus of an animal.

An object of the invention is to provide improved apparatus for use by packing houses and the like to facilitate separating the windpipe from the esophagus of an animal as one of the necessary steps in the dressing or preparation of the animal for the market.

Another object is to provide such apparatus controlled by one foot of the operator, wholly independently of the hands of the operator.

Another object is to provide such apparatus, controlled in the manner aforesaid, with a head characterized by a simple open arrangement of parts which are easily kept clean and in a sanitary condition, and with foot controlled means for rinsing said head.

Other objects of the invention will become apparent when the following description is read with reference to the accompanying drawings in which:

FIG. 1 is a perspective view of apparatus embodying the invention.

Apparatus embodying the invention comprises a base generally designated 10 provided with a horizontally extending top 12 and depending upright opposite sides 14. Carried by the base 10 is a pneumatic motor generally designated 16 including an upright cylinder 18, a lower head 20 seated upon the base 10, and an upper head 22. The heads 20 and 22 are tied together by a plurality of rods 24. The head 22 is provided with a collar 26 through which extends a piston rod 28 mounting a head generally designated 30. The head 30 includes a bar 32 affixed to the rod 28, a pair of pusher arms 34 secured by their lower ends, as by a bolt 38, to opposite sides of the bar 32 and diverging upwardly for mounting a pusher ring 36, having an upwardly presenting cutting edge 37.

Mounted upon the fore end portion of the base 10 is a foot actuated valve 40 provided with a body 42 from which extends a stem 44 carrying a pair of foot pedals 46 and 48. An air supply line 50 having a filter 52, a pressure regulator 54 and an oil cup 56 connected therein provides air through the valve 40 to the pneumatic motor 16 by means of a line 58 connected to the upper head 22 of the cylinder and a line 60 connected to the lower head 20 of the cylinder. Air from the pneumatic motor is exhausted through the lines 58 and 60, valve body 42 and outlet 62.

Also mounted upon the fore end portion of the base 10 is a foot actuated valve, generally designated 64, having a body 66 from which extends a stem 68 carrying a foot pedal 70. A water supply line 72 is connected with the valve body 66 and through the latter with a manifold line 74 which provides water through a spray line 76 to a spray head 78 and through a spray line 80 to a spray head 82. The spray line 76 is braced to the upper head 22 by a bracket 84, and the spray line 82 is braced to the upper head 22 by a bracket 86.

In the operation of the apparatus, the animal, for example, a calf, is slaughtered and its head removed. Then the animal is brought to the apparatus in a vertical position, suspended by its hind legs. The esophagus, designated 88, is pulled downwardly through the push ring 36 and laterally outwardly from between the arms 34. The windpipe, designated 90, remains on the outside of the ring 36. Next, the esophagus and windpipe are held by the operator or otherwise anchored, so that they cannot move upwardly. As illustrated, the valve 40 is in its neutral condition. The operator depresses pedal 46, whereupon air under pressure passes from line 50, through valve body 42 and line 60 to the cylinder head 20, in consequence of which the piston rod 28 moves upwardly, carrying the head 30. The ring 36 pushes upwardly and cuts the membranes, designated 92, connecting the esophagus and windpipe. Simultaneously with movement of the piston rod 28 upwardly, air is vented from the upper end of the pneumatic motor 16 through line 58, valve body 42 and vent 62.

The operator now releases pedal 46, and the valve 40 automatically returns to its neutral condition. Now the operator depresses pedal 48, whereupon air under pressure passes through line 50, valve body 42 and line 58 to the cylinder head 22, in consequence of which the piston rod 28 and head 30 are retracted and returned to their initial positions. The operator now releases pedal 48, whereupon the valve 40 automatically returns to its neutral condition. Simultaneously with movement of the piston rod 28 downwardly, air is vented from the lower end of the pneumatic motor 16 through line 60, valve body 42 and vent 62. The animal thus treated is now pushed away to make room for another to be treated in the same manner. When piston rod 28 and the head 30 are fully retracted, the operator depresses pedal 70, whereupon the valve 64 opens and hot water, preferably at 180° F., is directed upon the piston rod 28 through spray head 78 and upon the head 30 of the piston rod through spray head 82. The piston rod and its head having been sprayed, the operator releases the pedal 70 to close the valve 64 and another animal is moved into position over the apparatus.

It will be understood, of course, that the present invention is susceptible to various modifications which may be made without departing from the real spirit or general principles thereof, and accordingly it is intended to claim the same broadly, as well as specifically, as indicated in the appended claims.

Having thus described our invention, we claim as follows:

1. Apparatus for separating the esophagus from the windpipe of a slaughtered animal suspended by its hind legs over the apparatus, a rigid base member, a fluid motor including a cylinder affixed to said base member, a piston working in said cylinder, and a piston rod extending through one end of said cylinder, membrane cutting means in the form of a cylindrical part, a pair of arms mounted on diametrically opposite sides of said piston rod and extending outwardly therefrom in laterally spaced relation to each other and in longitudinal continuation of said piston rod to mount said cylindrical part in axially spaced relation to said piston rod for movement therewith, said cylindrical part having an axially tapered membrane cutting edge extending about the outer terminal portion thereof, a fluid pressure system for actuating said piston including a valve mounted upon said base, and foot actuated means controlling the flow of fluid through said valve thereby to deliver fluid pressure selectively to opposite ends of said cylinder for extending and retracting said piston rod, the latter being operable for pushing said cylindrical part outwardly between the esophagus and windpipe with said membrane cutting edge leading.

2. Apparatus in accordance with claim 1 wherein said cutting edge tapers axially inwardly from the outer peripheral surface of said cylindrical member.

3. Apparatus for separating the esophagus from the windpipe of a slaughtered animal suspended by its hind legs over the apparatus, a rigid base member, a fluid motor including a cylinder affixed to said base member, a piston working in said cylinder, and a piston rod extending through one end of said cylinder, membrane cutting means in the form of a cylindrical part, a pair of arms mounted on diametrically opposite sides of said piston rod and extending outwardly therefrom in laterally spaced relation to each other and in longitudinal continuation of said piston rod to mount said cylindrical part in axially spaced relation to said piston rod for movement therewith, said cylindrical part having an axially tapered membrane cutting edge extending about the outer terminal portion thereof, a fluid pressure system for actuating said piston including a first valve mounted upon said base, and first foot actuated means controlling the flow of fluid through said first valve thereby to deliver fluid pressure selectively to opposite ends of said cylinder for extending and retracting said piston rod, the latter being operable for pushing said cylindrical part outwardly between the esophagus and windpipe with said membrane cutting edge leading, a plurality of spray heads respectively directed upon selected portions of the apparatus, means connecting said spray heads with a source of cleansing fluid, a second valve connected in the last mentioned means for controlling the flow of cleansing fluid through said second valve to said spray heads, said first and second foot actuated means being aligned across the fore end of said base member to be easily accessible to the operator.

References Cited in the file of this patent

UNITED STATES PATENTS

| | | |
|---|---|---|
| 1,699,695 | Feister | Jan. 22, 1929 |
| 2,103,317 | Cavagnaro | Dec. 28, 1937 |
| 2,108,921 | McKim | Feb. 22, 1938 |
| 2,505,964 | Hincks | May 2, 1950 |